United States Patent
Osborn

(10) Patent No.: US 11,118,030 B2
(45) Date of Patent: Sep. 14, 2021

(54) HALOGEN-CONTAINING FLAME RETARDANT POLYAMIDE COMPOSITIONS

(71) Applicant: Ascend Performance Materials Operations LLC, Houston, TX (US)

(72) Inventor: Shawn J. Osborn, Pace, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 108 days.

(21) Appl. No.: 16/161,342

(22) Filed: Oct. 16, 2018

(65) Prior Publication Data

US 2019/0112455 A1   Apr. 18, 2019

Related U.S. Application Data

(60) Provisional application No. 62/574,157, filed on Oct. 18, 2017.

(51) Int. Cl.
| | |
|---|---|
| C08K 13/02 | (2006.01) |
| C09K 21/08 | (2006.01) |
| C08K 5/02 | (2006.01) |
| C08K 5/20 | (2006.01) |
| C08K 3/22 | (2006.01) |
| C08K 3/04 | (2006.01) |
| C08G 69/26 | (2006.01) |
| C08K 5/134 | (2006.01) |
| C08K 5/12 | (2006.01) |
| C08K 5/03 | (2006.01) |
| C08K 3/34 | (2006.01) |
| C08K 3/26 | (2006.01) |

(52) U.S. Cl.
CPC ............. *C08K 13/02* (2013.01); *C08G 69/26* (2013.01); *C08K 3/04* (2013.01); *C08K 3/2279* (2013.01); *C08K 5/02* (2013.01); *C08K 5/03* (2013.01); *C08K 5/12* (2013.01); *C08K 5/1345* (2013.01); *C08K 5/20* (2013.01); *C09K 21/08* (2013.01); *C08K 3/26* (2013.01); *C08K 3/34* (2013.01); *C08K 2003/267* (2013.01); *C08K 2201/014* (2013.01)

(58) Field of Classification Search
CPC ............. C08K 5/13; C08K 5/20; C08K 3/014
See application file for complete search history.

(56) References Cited

U.S. PATENT DOCUMENTS

| | | | |
|---|---|---|---|
| 2,822,243 A | 2/1958 | Brix | |
| 2,822,244 A | 2/1958 | Cornely | |
| 2,996,358 A | 8/1961 | Milton | |
| 3,010,789 A | 11/1961 | Milton | |
| 3,011,869 A | 12/1961 | Breck | |
| 3,102,853 A | 9/1963 | Skarstrom et al. | |
| 3,130,007 A | 4/1964 | Breck | |
| 3,216,789 A | 11/1965 | Breck | |
| 3,879,523 A | 4/1975 | Miyata et al. | |
| 4,351,814 A | 9/1982 | Miyata et al. | |
| 4,656,156 A | 4/1987 | Misra | |
| 4,904,457 A | 2/1990 | Misra | |
| 5,053,447 A | 10/1991 | Hussain | |
| 5,116,587 A | 5/1992 | Pinnavaia et al. | |
| 5,246,899 A | 9/1993 | Bhattacharyya | |
| 5,348,725 A | 9/1994 | Misra et al. | |
| 5,437,720 A | 8/1995 | Cox et al. | |
| 5,578,286 A | 11/1996 | Martin et al. | |
| 5,811,490 A * | 9/1998 | Jozokos .................. | C08L 77/02 525/179 |
| 6,531,526 B1 | 3/2003 | Detterman et al. | |
| 2002/0086927 A1* | 7/2002 | De Schryver ........... | C08L 67/02 524/404 |
| 2003/0159773 A1* | 8/2003 | Tomiyama ................ | C09J 7/10 156/248 |
| 2006/0257653 A1* | 11/2006 | Tsujimoto ................ | B41M 5/26 428/364 |
| 2007/0123625 A1* | 5/2007 | Dorade ..................... | C08J 3/226 524/423 |
| 2010/0160501 A1* | 6/2010 | Tsunoda .............. | C08L 2666/06 524/101 |
| 2010/0331452 A1* | 12/2010 | Tsou ....................... | C08L 77/00 523/351 |
| 2012/0035303 A1 | 2/2012 | Schmidt et al. | |
| 2015/0148468 A1* | 5/2015 | Immel .................... | C08K 5/005 524/222 |
| 2017/0058099 A1 | 3/2017 | Endtner et al. | |

FOREIGN PATENT DOCUMENTS

| | | | |
|---|---|---|---|
| CN | 103319885 A | * | 9/2013 |
| WO | 92/13717 A1 | | 8/1992 |
| WO | WO 2018/117834 A1 | * | 6/2018 |

OTHER PUBLICATIONS

CN 103319885 A machine translation (2013).*
International Search Report issued in corresponding PCT Application No. PCT/US18/56000 dated Jan. 8, 2019.
Written Opinion issued in corresponding PCT Application No. PCT/US18/56000 dated Jan. 8, 2019.

* cited by examiner

Primary Examiner — Ana L. Woodward
(74) Attorney, Agent, or Firm — Cozen O'Connor

(57) ABSTRACT

Flame retardant thermoplastic polyamide compositions are described that provide a superior combination of glow wire ignition and elongation/toughness properties, comprising a polyamide resin; a bromine-containing flame retardant; a hindered phenolic heat stabilizer; and optionally at least one of a flame retardant synergist, a plasticizer, a lubricant, a mold release agent, an acid scavenger and a colorant.

14 Claims, No Drawings

HALOGEN-CONTAINING FLAME RETARDANT POLYAMIDE COMPOSITIONS

BACKGROUND OF THE INVENTION

Polyamide resins find use in numerous applications due to their high melting points, high recrystallization temperatures (i.e., faster injection molding cycle times), high flow, toughness and elasticity, chemical resistance, inherent UL94 V2 flame retardancy, abrasion resistance, and overall mechanical properties. As a result, polyamides are ideal for use in cable ties, consumer and industrial applications (e.g., sports equipment, window thermal breaks, aerosol valves, food film packaging), automotive/vehicle parts (e.g., radiator end tanks, charge air coolers, fans and shrouds, push/pull cables), industrial fibers (e.g., airbags, tire cords), and electrical/electronic parts (e.g., connectors, terminal blocks, battery seals, photovoltaics, LEDs, circuit breakers).

Specifically in the electrical/electronic industry, thermoplastic polyamides are extensively used in the preparation of molded connectors for unattended appliance applications, such as washers, dryers, dishwashers, HVAC units, etc. International Standard IEC 60335-1 defines the performance of these thermoplastic compositions in household and similar electrical appliances. According to IEC 60335-1, any thermoplastic components that are in contact with electrical conductors operating at greater than 0.2 Amps must pass the glow wire ignition test (GWIT) which is performed to ensure that the end product does not ignite and spread flames if an ignition source (such as an overheated part) comes into contact with a thermoplastic component. In particular, according to IEC 60695-2, the final thermoplastic component must sustain direct contact with a glow wire at 750° C. for 30 seconds, with any ignition event extinguishing within 2 seconds. Despite the tremendous variations in possible geometries of the final molded part, the base resin must exceed a GWIT of 750° C. when tested in the default 60×60 mm plaque shape to ensure that the final part passes safety requirements regardless of its geometry.

Historically, chlorine-containing flame retardants were primarily used in thermoplastic polyamide compositions in an attempt to satisfy the aforementioned GWIT requirements and the desired flame retardancy ratings. The flame retardant is added to the polyamide composition and may act in the solid, liquid or gas phase chemically (e.g., by liberation of nitrogen) and/or physically (e.g., by producing a foam). The flame retardants typically interfere with combustion at a specific stage of the combustion process, such as during heating, decomposition, ignition or flame spread.

Examples of conventional chlorine-containing flame retardants include, but are not limited to, chlorinated paraffin, chlorinated polyethylene, dodecachloropentacyclooctadeca-7,15-diene (Dechlorane Plus® 25), and HET anhydride.

Bromine-containing flame retardants have more recently largely displaced chlorine-containing flame retardants in view of the absence of undesirable characteristics (such as instability) associated with the use of chlorine-containing flame retardants. Examples of bromine-containing flame retardants include hexabromocyclododecane (HBCD), decabromodiphenyl oxide (DBDPO), octabromodiphenyl oxide, tetrabromobisphenol A (TBBA), bis(tribromophenoxy)ethane, bis(pentabromophenyl)ethane, tetrabromobisphenol A epoxy resin (TBBA epoxy), tetrabromobisphenol A carbonate (TBBA-PC), ethylene(bistetrabromophthal)imide (EBT-BPI), ethylenebispentabromodiphenyl, tris(tribromophenoxy)triazine (TTBPTA), bis(dibromopropyl) tetrabromobisphenol A (DBP-TBBA), bis(dibromopropyl) tetrabromobisphenol S (DBP-TBBS), brominated polyphenylene ethers (BrPPE) (such as poly(di)bromophenylene ether, etc.), brominated polystyrenes (BrPPE) (such as polydibromostyrenes, polytribromostyrenes, crosslinked brominated polystyrenes, etc.), brominated crosslinked aromatic polymers, brominated epoxy resins, brominated phenoxy resins, brominated styrene-maleic anhydride polymers, tetrabromobisphenol S (TBBS), tris(tribromoneopentyl) phosphate (TTBNPP), polybromotrimethylphenylindan (PBPI), and tris(dibromopropyl)-isocyanurate (TDBPIC).

Desirable bromine-containing flame retardants for incorporation into a thermoplastic material result in minimal generation of corrosive gases during melt processing of the thermoplastic material (such as during extrusion and molding) and maintenance of the thermoplastic material's flame resistance and mechanical properties. Examples of such flame retardants include, but are not limited to, brominated polyphenylene ethers (including poly(di)bromophenylene ether, etc.) and brominated polystyrenes (including polydibromostyrene, polytribromostyrene, crosslinked brominated polystyrene, etc.). Brominated polystyrene is one of the most commonly used retardants in conventional thermoplastic compositions.

Halogen-based flame retardants may also be used in combination with one or more flame retardant synergists. Conventional flame retardant synergists include, but are not limited to, antimony oxides (such as diantimony trioxide, diantimony tetroxide, diantimony pentoxide and sodium antimonate), tin oxides (such as tin monoxide and tin dioxide), iron oxides (such as iron(II) oxide and γ-iron oxide), zinc oxide and zinc borate.

Acid scavengers are known to stabilize halogen-containing polymers, especially during processing. Modified zeolites as acid scavengers are described in U.S. Pat. No. 6,531,526.

Heat stabilizers may also be employed in polyamide resins. Conventional heat stabilizers include, but are not limited to, hindered phenolic stabilizers, phosphite-based stabilizers, hindered amine-based stabilizers, triazine-based stabilizers, sulfur-based stabilizers and copper-based stabilizers.

In the electrical/electronic industry, there is a trend toward miniaturization and integration of electronic components that is increasing the demand for higher performing thermoplastic resins. The polyamides of the present invention are able to meet these expanded demands by providing increased GWIT temperatures, improved flame retardancies, superior heat resistance and improved elongation at break/toughness. The unique combination of elevated GWIT temperatures and elongation at break allow the polyamide compositions of the present invention to satisfy a long-felt need in, for example, various snap-fit and living hinge connectors employed in devices representing the unattended appliance industry and to successfully meet the requirements of IEC 60335-1 and to meet the demand for higher performing polymeric materials.

SUMMARY OF THE INVENTION

An aspect of the present invention is a thermoplastic polyamide composition comprising a polyamide resin, a bromine-containing flame retardant; and a hindered phenolic heat stabilizer.

Another aspect of the present invention is a thermoplastic polyamide composition comprising a polyamide resin, a bromine-containing flame retardant; a hindered phenolic heat stabilizer; and at least one of a flame retardant synergist, a plasticizer, a lubricant, a mold release agent, an acid scavenger and a colorant.

In a particular embodiment, the thermoplastic polyamide composition comprises a polyamide resin, a bromine-containing flame retardant; a hindered phenolic heat stabilizer; and at least two of a flame retardant synergist, a plasticizer, a lubricant, a mold release agent, an acid scavenger and a colorant.

In a particular embodiment, the thermoplastic polyamide composition comprises a polyamide resin, a bromine-containing flame retardant; a hindered phenolic heat stabilizer; and at least three of a flame retardant synergist, a plasticizer, a lubricant, a mold release agent, an acid scavenger and a colorant.

In a particular embodiment, the thermoplastic polyamide composition comprises a polyamide resin, a bromine-containing flame retardant; a hindered phenolic heat stabilizer; and at least four of a flame retardant synergist, a plasticizer, a lubricant, a mold release agent, an acid scavenger and a colorant.

In a particular embodiment, the thermoplastic polyamide composition comprises a polyamide resin, a bromine-containing flame retardant; a hindered phenolic heat stabilizer; and at least five of a flame retardant synergist, a plasticizer, a lubricant, a mold release agent, an acid scavenger and a colorant.

In an exemplary embodiment, the polyamide resin is selected from the group consisting of PA-4,6; PA-6,I; PA-6, T; PA-6,6; PA-6/6,6; and mixtures thereof.

In a particular embodiment, the polyamide resin is PA-6, 6.

In an exemplary embodiment, the PA-6,6 resin is one or more selected from the group consisting of high viscosity, medium viscosity and low viscosity. In a particular embodiment, the PA-6,6 is high viscosity. In another particular embodiment, the PA-6,6 is medium viscosity. In another particular embodiment, the PA-6,6 is low viscosity. In another particular embodiment, the PA-66 is a mixture of high viscosity and low viscosity.

In a particular embodiment, the bromine-containing flame retardant is a bis(pentabromophenyl)ethane.

In an exemplary embodiment, the thermoplastic polyamide composition further comprises a flame retardant synergist.

In a particular embodiment, the flame retardant synergist is diantimony trioxide.

In an exemplary embodiment, the thermoplastic polyamide composition further comprises a plasticizer.

In a particular embodiment, the plasticizer is diundecyl phthalate.

In a particular embodiment, the hindered phenolic heat stabilizer is N,N'-hexamethylenebis(3,5-di-tert-butyl-4-hydroxy-hydrocinnamamide.

In an exemplary embodiment, the thermoplastic polyamide composition further comprises a lubricant.

In an exemplary embodiment, the thermoplastic polyamide composition further comprises a mold release agent.

In an exemplary embodiment, the lubricant/mold release agent is selected from the group consisting of N,N' ethylene bisstearylamide, stearic acid salts and mixtures thereof.

In a particular embodiment, the lubricant/mold release is N,N' ethylene bisstearylamide.

In an exemplary embodiment, the thermoplastic polyamide composition further comprises a colorant.

In a particular embodiment, the colorant is carbon black.

In an exemplary embodiment, the thermoplastic polyamide composition further comprises an acid scavenger.

In a particular embodiment, the acid scavenger is a zeolite or a hydrotalcite.

In an exemplary embodiment, the thermoplastic polyamide composition comprises: 60-85% by weight of the polyamide resin; 5-35% by weight of the bromine-containing flame retardant; 0.01-5% by weight of a hindered phenolic heat stabilizer; 1-10% by weight of a flame retardant synergist; 0.5-5% by weight of a plasticizer; 0-5% by weight of a lubricant; 0-5% by weight of a mold release agent (or 0-5% by weight of a lubricant/mold release agent); 0-5% by weight of a colorant; and 0-5% by weight of an acid scavenger.

In a particular embodiment, the polyamide resin is PA-6, 6, the halogen-containing flame retardant is a bis(pentabromophenyl)ethane, the flame retardant synergist is diantimony trioxide, the plasticizer is diundecyl phthalate, the hindered phenolic complex is N,N'-hexamethylenebis(3,5-di-tert-butyl-4-hydroxy-hydrocinnamamide), the lubricant/mold release agent is N,N' ethylene bisstearylamide, the colorant is carbon black and the acid scavenger is a zeolite or a hydrotalcite.

Another aspect of the invention is an article obtained or prepared from the thermoplastic polyamide composition. In an exemplary embodiment, the article is an electrical/electronic part.

DETAILED DESCRIPTION OF THE INVENTION

The flame retardant polyamide compositions of the present invention are superior to conventional flame retardant compositions in their consistently elevated high glow wire ignition temperatures (such as 800° C. or higher, such as 850° C. or higher) combined with high RTI values and desirable mechanical properties, such as increased processability (superior elongation) and ductility.

The polyamide resin component of the flame retardant composition of the invention is not particularly limited. In an exemplary embodiment, the polyamide resin is selected from the group consisting of PA-6; PA-6,6; PA-6,10; PA-4,6; PA-11; PA-12; PA-12,12; PA-6, I; PA-6,T; PA-6,T/6,6-copolyamide; PA-6,T/6-copolyamide; PA-6/6,6-copolyamide; PA-6,6/6,T/6,1-copolyamide; PA-6,T/2-MPMDT-copolyamide; PA-9,T; PA-4,6/6-copolyamide; and mixtures and copolyamides of the aforementioned polyamides. In a particular embodiment, the polyamide resin is selected from the group consisting of PA-4,6; PA-6,I; PA-6,T; PA-6,6; PA-6/6,6; and a mixture or copolyamide thereof. In an exemplary embodiment, the polyamide resin is one or more selected from the group consisting of a high viscosity polyamide resin, a medium viscosity polyamide resin and a low viscosity polyamide resin. In a particular embodiment, the polyamide resin is high viscosity PA-6,6. In another particular embodiment, the polyamide resin is medium viscosity PA-6,6. In another particular embodiment, the polyamide resin is low viscosity PA-6,6. In another particular embodiment, the polyamide resin is a mixture of high viscosity PA-6,6 and low viscosity PA-6,6. In another particular embodiment, the polyamide resin is a copolymer of PA-6,6 and PA-6. In another particular embodiment, the polyamide resin is PA-6,6 in the form of a fine powder.

Conventional bromine-containing flame retardants are generally suitable for use in the compositions of the present invention. In a particular embodiment, the bromine-containing flame retardant is a bis(pentabromophenyl)ethane, such as commercially available SAYTEX® 8010 (Albemarle).

Historically, preferred heat stabilizers for polyamides have been copper iodide or copper acetate because of their excellent resistance to heat aging. However, due to their negative effect on electrical properties such as dielectric strength, surface and volume resistivity, and comparative tracking index (CTI), these copper salts are not typically suitable for use in electrical/electronic applications. In an exemplary embodiment of the present invention, the heat stabilizer is a hindered phenolic complex. Examples of hindered phenolic stabilizers include, but are not limited to, N,N'-hexane-1,6-diylbis[3-(3,5-di-tert-butyl-4-hydroxyphenylpropionamide)]; pentaerythrityl-tetrakis[3-(3,5-di-tert-butyl-4-hydroxyphenyl)propionate]; N,N'-hexamethylenebis(3,5-di-tert-butyl-4-hydroxy-hydrocinnamamide); triethyleneglycol-bis[3-(3-tert-butyl-5-methyl-4-hydroxyphenyl)propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzylphosphonate diethyl ester; 1,3,5-trimethyl-2,4,6-tris(3,5-di-tert-butyl-4-hydroxybenzyl)benzene; and 1,3,5-tris(4-tert-butyl-3-hydroxy-2,6-dimethylbenzyl) isocyanurate. In a particular embodiment, the heat stabilizer is N,N'-hexamethylenebis(3,5-di-tert-butyl-4-hydroxy-hydrocinnamamide), which is commercially available under several names, such as, Irganox® 1098 (BASF), Lowinox® HD98 (Addivant), Songnox® 1098 (Songwon).

In an exemplary embodiment, the polyamide compositions of the invention contain a plasticizer. Plasticizers assist in increasing the flow of the compositions and provide toughness/increased elongation at break. Examples of suitable plasticizers include those commonly used in polyamides, such as, but not limited to, diundecyl phthalate, dioctyl phthalate, dibenzyl phthalate, butyl benzyl phthalate, hydrocarbon oils, N-(n-butyl)benzenesulphonamide. In an exemplary embodiment, the plasticizer is diundecyl phthalate which is commercially available under several names, such as, Jayflex™ L11P (Exxon Mobil) and Palatinol® 111P (BASF).

In an exemplary embodiment, the compositions of the invention contain a lubricant/mold release agent. Suitable lubricant/mold release agents for use in the present invention include, but are not limited to, long-chain fatty acids (e.g., stearic acid or behenic acid), their salts (e.g., Ca stearate or Zn stearate) or their ester or amide derivatives (e.g., N,N' ethylene bisstearylamide), montan waxes (mixtures composed of straight-chain, saturated carboxylic acids having chain lengths of from 28 to 32 carbon atoms) or low-molecular weight polyethylene waxes or low-molecular weight polypropylene waxes. In an exemplary embodiment, the lubricant/mold release agent is N,N' ethylene bisstearylamide, which is commercially available as Acrawax®.

In an exemplary embodiment, the polyamide compositions of the invention contain an acid scavenger for stabilization. In a particular embodiment, the acid scavenger is a zeolite, which includes modified zeolites. In a particular embodiment, the zeolite has a mean particle diameter in the range of about 0.25 to about 1.5 μm, a less than 90% value particle diameter (i.e., 90% by weight of the particles have a particle diameter below the range) of about 0.30 to about 3 μm, and a water content of less than 10 weight percent. In a particular embodiment, the zeolite is an aluminosilicate zeolite and may have a general formula of $M_{2/n}O$: $[Al_2O_3]_x \cdot [SiO_2]_y \cdot [H_2O]_z$, where M represents a metal, n represents the valence of the metal and x, y and z vary depending on the specific aluminosilicate zeolite. In a particular embodiment, the zeolite is one or more selected from the group consisting of zeolite A (U.S. Pat. No. 2,822,243); zeolite X (U.S. Pat. No. 2,822,244); zeolite Y (U.S. Pat. No. 3,130,007); zeolite L (Belgian Patent 575,117); zeolite F (U.S. Pat. No. 2,996,358) zeolite B (U.S. Pat. No. 3,008,803); zeolite M (U.S. Pat. No. 2,995,423); zeolite H (U.S. Pat. No. 3,010,789); zeolite L (U.S. Pat. No. 3,011,869); and zeolite W (U.S. Pat. No. 3,102,853). In another exemplary embodiment, the acid scavenger is an alkaline-earth-containing aluminum hydroxide carbonate, which includes naturally occurring hydrotalcites (magnesium-containing aluminum hydroxide carbonates), synthetic hydrotalcites and anionic clays, in both their hydrated and dehydrated states. Hydrotalcites suitable for use in the present invention include, but are not limited to, Stabiace HT-9 (Sakai Chemical), DHT-4C (Kisuma Chemicals) and the hydrotalcites described in U.S. Pat. Nos. 3,879,523; 4,351,814; 4,656,156; 4,904,457; 5,348,725; 5,246,899; 5,116,587; 5,437,720; and 5,578,286.

In an exemplary embodiment, the polyamide compositions of the invention contain a colorant for the purpose of satisfying the aesthetic requirements of the final application of the composition. Examples of suitable colorants include those commonly used in polyamides, such as, but not limited to, inorganic pigments (such as titanium dioxide, ultramarine blue, iron oxide, zinc sulphide and carbon black) and also organic pigments (such as phthalocyanines, quinacridones and perylenes) and dyes (such as nigrosine and anthraquinones). In an exemplary embodiment, the colorant is carbon black.

In an exemplary embodiment, the thermoplastic polyamide composition comprises 60-90% by weight of the polyamide resin, such as 60-85% by weight, such as 60-80% by weight, such as 60-75% by weight, such as 60-70% by weight, such as 65-85% by weight, such as 65-80% by weight, such as 65-75% by weight, such as 60-70% by weight.

In an exemplary embodiment, the thermoplastic polyamide composition comprises 5-35% by weight of a bromine-containing flame retardant, such as 5-30% by weight, such as 10-25% by weight, such as 10-20% by weight, such as 15-25% by weight, such as 15-20% by weight.

In an exemplary embodiment, the thermoplastic polyamide composition comprises 0.01-5% by weight of a hindered phenolic heat stabilizer, such as 0.05-5% by weight, such as 0.05-3% by weight, such as 0.1-3% by weight, such as 0.1-2% by weight.

In an exemplary embodiment, the thermoplastic polyamide composition comprises 1-10% by weight of a flame retardant synergist, such as 1-8% by weight, such as 1-6% by weight, such as 1-5% by weight, such as 2-8% by weight, such as 2-6% by weight.

In an exemplary embodiment, the thermoplastic polyamide composition comprises 0.5-5% by weight of a plasticizer, such as 1-5% by weight, such as 1-3% by weight, such as 0.5-3% by weight.

In an exemplary embodiment, the thermoplastic polyamide composition independently comprises 0-5% by weight of each of a lubricant, a mold release agent and an acid scavenger, such as independently 0.05-5% by weight of a lubricant, a mold release agent and an acid scavenger, such as independently 0.05-3% by weight, such as 0.05-1% by weight, such as 0.1-5% by weight, such as 0.1-3% by weight, such as 0.1-1% by weight, such as 1-5% by weight, such as 1-3% by weight.

In an exemplary embodiment, the thermoplastic polyamide composition comprises 65-80% by weight of high viscosity PA-6,6 as the polyamide resin; 15-25% by weight bis(pentabromophenyl)ethane as the flame retardant; 1-5% by weight diantimony trioxide as the flame retardant synergist; 1-5% by weight diundecyl phthalate as the plasticizer; 0.05-3% by weight N,N'-hexamethylenebis(3,5-di-tert-butyl-4-hydroxy-hydrocinnamamide) as the heat stabilizer; and 0.05-3% by weight of N,N' ethylene bisstearylamide as the lubricant/mold release agent.

In an exemplary embodiment, the thermoplastic polyamide composition comprises 65-80% by weight of medium viscosity PA-6,6 as the polyamide resin; 15-25% by weight bis(pentabromophenyl)ethane as the flame retardant; 1-5% by weight diantimony trioxide as the flame retardant synergist; 1-5% by weight diundecyl phthalate as the plasticizer; 0.05-3% by weight N,N'-hexamethylenebis(3,5-di-tert-butyl-4-hydroxy-hydrocinnamamide) as the heat stabilizer; and 0.05-3% by weight of N,N' ethylene bisstearylamide as the lubricant/mold release agent.

In an exemplary embodiment, the thermoplastic polyamide composition comprises 65-80% by weight of low viscosity PA-6,6 as the polyamide resin; 15-25% by weight bis(pentabromophenyl)ethane as the flame retardant; 1-5% by weight diantimony trioxide as the flame retardant synergist; 1-5% by weight diundecyl phthalate as the plasticizer; 0.05-3% by weight N,N'-hexamethylenebis(3,5-di-tert-butyl-4-hydroxy-hydrocinnamamide) as the heat stabilizer; and 0.05-3% by weight of N,N' ethylene bisstearylamide as the lubricant/mold release agent.

In an exemplary embodiment, the thermoplastic polyamide composition comprises 65-80% by weight of a mixture of high viscosity and medium viscosity PA-6,6 as the polyamide resin; 15-25% by weight bis(pentabromophenyl)ethane as the flame retardant; 1-5% by weight diantimony trioxide as the flame retardant synergist; 1-5% by weight diundecyl phthalate as the plasticizer; 0.05-3% by weight N,N'-hexamethylenebis(3,5-di-tert-butyl-4-hydroxy-hydrocinnamamide) as the heat stabilizer; and 0.05-3% by weight of N,N' ethylene bisstearylamide as the lubricant/mold release agent.

EXAMPLES

Example 1. General Preparation of an Exemplary Halogen-Containing Flame Retardant Polyamide Composition of the Invention A polyamide feedstock and a plasticizer were placed in a drum and tumbled for 10-15 minutes. A halogen-containing flame retardant, a flame retardant synergist, a phenolic heat stabilizer, a lubricant/mold release agent, and a colorant were added to the drum and blended for an additional 10-15 minutes. The final blend was then placed in a hopper and added at the feed throat of a ZSK 40 mm twin screw extruder with extruder barrel temperatures ranging from 220-285° C., a screw speed of 400 rpm, and a throughput of 100 kg/hr to provide the desired polyamide composition.

Molded articles containing the polyamide composition were produced on a Van Dorn 50-ton injection molding machine with cylinder temperatures of 250-285° C. (from hopper to nozzle) and a mold temperature of 95° C. for determining mechanical and thermal material properties.

The following internationally recognized standardized tests were employed for measuring various properties of the polyamide compositions of the invention and the articles prepared therefrom.

Tensile properties, stress, strain, and modulus were measured according to ISO 527-2.

Flexural properties, strength and modulus were measured according to ISO 178.

Charpy Notched Impact Strength at 23° C. was measured according to ISO 179/1eA.

Charpy Unnotched Impact Strength at 23° C. was measured according to ISO 179/1eU.

Izod Notched Impact Strength at +23° C. was measured according to ISO 180.

Heat Deflection Temperature (HDT) with an applied load of 1.80 MPa was performed according to ISO 75-2/A.

Polyamide composition melting points were determined according to ISO 11357-3.

Relative Viscosity (RV) values were measured according to ASTM D789.

Flammability testing was conducted on samples at various thicknesses (0.4 mm, 0.75 mm, 1.5 mm, and 3.0 mm) according to the UL94 standard.

Glow Wire Flammability Index (GWFI) was performed on samples at various thicknesses (0.4 mm, 0.75 mm, 1.5 mm, and 3.0 mm) according to IEC 60695-2-12.

Glow Wire Ignition Temperature (GWIT) was performed on samples at various thicknesses (0.4 mm, 0.75 mm, 1.5 mm, and 3.0 mm) according to IEC 60695-2-13.

Volume Resistivity was measured according to IEC 60093.

Dielectric Strength was measured according to IEC 60243.

Arc Resistance was measured according to ASTM D495.

Comparative Tracking Index (CTI) was measured according to both IEC 60112 and ASTM D3638.

High Amp Arc Ignition (HAI) was performed on samples at various thicknesses (0.4, 0.75, 1.5, and 3.0 mm) according to UL 746.

Hot Wire Ignition (HWI) was performed on samples at various thicknesses (0.4, 0.75, 1.5, and 3.0 mm) according to UL 746.

High Voltage Arc Tracking Rate (HVTR) was measured according to UL 746.

Relative Thermal Index (RTI) values were obtained at various thicknesses (0.4, 0.75, 1.5, and 3.0 mm) for Electrical, Impact, and Strength criteria according to UL 746.

Table 1 lists the results of standard test methods on an exemplary polyamide composition of the invention where the polyamide resin was PA-6,6; the flame retardant was bis(pentabromophenyl)ethane; the flame retardant synergist was diantimony trioxide; the plasticizer was diundecyl phthalate; the heat stabilizer was N,N'-hexamethylenebis(3,5-di-tert-butyl-4-hydroxy-hydrocinnamamide); and the lubricant/mold release agent was N,N' ethylene bisstearylamide (hereinafter referred to as Example 1).

TABLE 1

|  | Value | Unit | Test Method |
|---|---|---|---|
| Physical Property | | | |
| Relative Viscosity | 47 | | ASTM D789 |
| Mechanical Property | | | |
| Tensile Modulus (23° C.) | 3200 | MPa | ISO 527-2 |
| Tensile Stress (Yield, 23° C.) | 70 | MPa | ISO 527-2 |
| Tensile Strain (Break, 23° C.) | 15 | % | ISO 527-2 |
| Flexural Modulus (23° C.) | 3200 | MPa | ISO 178 |
| Flexural Strength (23° C.) | 90 | MPa | ISO 178 |
| Impact Property | | | |
| Charpy Notched Impact Strength (23° C.) | 4.3 | kJ/m2 | ISO 179/1eA |

TABLE 1-continued

| | Value | Unit | Test Method |
|---|---|---|---|
| Charpy Unnotched Impact Strength (23° C.) | 65 | kJ/m2 | ISO 179/1eU |
| Notched Izod Impact Strength (23° C.) | 4.1 | kJ/m2 | ISO 180 |
| Thermal Property | | | |
| Heat Deflection Temperature (1.8 MPa, Unannealed) | 80 | ° C. | ISO 75-2/A |
| Melting Temperature | 265 | ° C. | ISO 11357-3 |
| RTI Elec (0.400 mm) | 130 | ° C. | UL 746 |
| RTI Elec (0.750 mm) | 130 | ° C. | UL 746 |
| RTI Elec (1.50 mm) | 130 | ° C. | UL 746 |
| RTI Elec (3.00 mm) | 130 | ° C. | UL 746 |
| RTI Imp (0.400 mm) | N.A. | ° C. | UL 746 |
| RTI Imp (0.750 mm) | N.A. | ° C. | UL 746 |
| RTI Imp (1.50 mm) | N.A. | ° C. | UL 746 |
| RTI Imp (3.00 mm) | N.A. | ° C. | UL 746 |
| RTI Str (0.400 mm) | 110 | ° C. | UL 746 |
| RTI Str (0.750 mm) | 110 | ° C. | UL 746 |
| RTI Str (1.50 mm) | 110 | ° C. | UL 746 |
| RTI Str (3.00 mm) | 110 | ° C. | UL 746 |
| Electrical Property | | | |
| Volume Resistivity (0.750 mm) | 1.00E+18 | ohm · m | IEC 60093 |
| Dielectric Strength (1.00 mm) | 17 | kV/mm | IEC 60243 |
| Comparative Tracking Index (3.00 mm) | 300 | V | IEC 60112 |
| Comparative Tracking Index (3.00 mm) | 2 | PLC | ASTM D3638 |
| High Amp Arc Ignition (HAI) (0.200 mm) | 0 | PLC | US 746 |
| High Amp Arc Ignition (0.400 mm) | 0 | PLC | UL 746 |
| High Amp Arc Ignition (0.750 mm) | 0 | PLC | UL 746 |
| High Amp Arc Ignition (1.50 mm) | 0 | PLC | UL 746 |
| High Amp Arc Ignition (3.00 mm) | 0 | PLC | UL 746 |
| High Voltage Arc Tracking Rate (HVTR) | 0 | PLC | UL 746 |
| Hot-wire Ignition (HWI) (0.200 mm) | 0 | PLC | UL 746 |
| Hot-wire Ignition (0.400 mm) | 0 | PLC | UL 746 |
| Hot-wire Ignition (0.750 mm) | 0 | PLC | UL 746 |
| Hot-wire Ignition (1.50 mm) | 0 | PLC | UL 746 |
| Hot-wire Ignition (3.00 mm) | 0 | PLC | UL 746 |
| Flammability Property | | | |
| Flammability (UL Rating) (0.200 mm) | V-0 | | UL 94 |
| Flammability (UL Rating) (0.400 mm) | V-0 | | UL 94 |
| Flammability (UL Rating) (0.750 mm) | V-0 | | UL 94 |
| Flammability (UL Rating) (1.50 mm) | V-0 | | UL 94 |
| Flammability (UL Rating) (3.00 mm) | V-0 | | UL 94 |
| Glow Wire Flammability Index (0.200 mm) | 960 | ° C. | IEC 60695-2-12 |
| Glow Wire Flammability Index (0.400 mm) | 960 | ° C. | IEC 60695-2-12 |
| Glow Wire Flammability Index (0.750 mm) | 960 | ° C. | IEC 60695-2-12 |
| Glow Wire Flammability Index (1.50 mm) | 960 | ° C. | IEC 60695-2-12 |
| Glow Wire Flammability Index (3.00 mm) | 960 | ° C. | IEC 60695-2-12 |
| Glow Wire Ignition Temperature (0.200 mm) | 960 | ° C. | IEC 60695-2-13 |
| Glow Wire Ignition Temperature (0.400 mm) | 960 | ° C. | IEC 60695-2-13 |
| Glow Wire Ignition Temperature (0.750 mm) | 960 | ° C. | IEC 60695-2-13 |
| Glow Wire Ignition Temperature (1.50 mm) | 960 | ° C. | IEC 60695-2-13 |
| Glow Wire Ignition Temperature (3.00 mm) | 960 | ° C. | IEC 60695-2-13 |

Tables 2 to 5 list exemplary polyamide compositions of the invention and an exemplary comparative example.

TABLE 2

| Additive | Comparative Ex 1 | Ex 2 | Ex 3 | Ex 4 | Ex 5 | Ex 6 | Ex 7 | Ex 8 | Ex 9 |
|---|---|---|---|---|---|---|---|---|---|
| A | 84.5 | 81 | 79.4 | 76.4 | 76.4 | | | | |
| B | | | | | | 76.4 | 76.4 | | |
| C | | | | | | | | 76.4 | 76.4 |
| D | 0.4 | 0.4 | | | | | | | |
| E | 0.1 | 0.1 | 0.1 | 0.1 | 0.1 | 0.1 | 0.1 | 0.1 | 0.1 |
| F | 14.5 | 18 | 18 | 21 | 18 | 21 | 18 | 21 | 18 |
| G | | | | | 3 | | 3 | | 3 |
| H | 0.5 | 0.5 | 0.5 | 0.5 | 0.5 | 0.5 | 0.5 | 0.5 | 0.5 |
| I | | | 2 | 2 | 2 | 2 | 2 | 2 | 2 |
| TOTAL (wt %) | 100 | 100 | 100 | 100 | 100 | 100 | 100 | 100 | 100 |

A = PA66, low viscosity;

B = PA66, high viscosity;

C = PA66/6, copolymer;

D = PA66, fine powder to assist compounding;

E = Acrawax (lubricant);

F = bis(pentabromophenyl)ethane (halogen, bromine-containing flame retardant);

G = diantimony trioxide (synergist);

H = phenolic organic heat stabilizer;

I = diundecyl phthalate (plasticizer)

TABLE 3

| Additive | Ex 10 | Ex 11 | Ex 12 | Ex 13 | Ex 14 | Ex 15 | Ex 16 | Ex 17 |
|---|---|---|---|---|---|---|---|---|
| A | 75.9 | 71.4 | 71.4 | 71.4 | 71.4 | 69.4 | 76.4 | 74.4 |
| B | 0.1 | 0.1 | 0.1 | 0.1 | 0.1 | 0.1 | 0.1 | 0.1 |
| C | 18 | 18 | 18 | 18 | 18 | 20 | 18 | 18 |
| D | 3 | 3 | 3 | 3 | | | 3 | 3 |
| E | | | | | 3 | 3 | | |
| F | 0.5 | 0.5 | 0.5 | 0.5 | 0.5 | 0.5 | | |
| G | | | | | | | 0.5 | |
| H | | | | | | | | 2.5 |
| I | 2 | 2 | 2 | 2 | 2 | 2 | 2 | 2 |
| J | 0.5 | | | | | | | |
| K | | 5 | | | | | | |
| L | | | 5 | | | | | |
| M | | | | 5 | | | | |
| N | | | | | 5 | 5 | | |
| TOTAL (wt %) | 100 | 100 | 100 | 100 | 100 | 100 | 100 | 100 |

A = PA66, high viscosity;
B = Acrawax (lubricant);
C = bis(pentabromophenyl)ethane (halogen, bromine-containing flame retardant);
D = diantimony trioxide (synergist);
E = zinc borate (synergist);
F = phenolic organic heat stabilizer;
G = copper heat stabilizer;
H = copper iodide heat stabilizer in PA66;
I = diundecyl phthalate (plasticizer);
J = DHT-4C (acid scavenger);
K = Suzorite mica, untreated;
L = Suzorite mica, treated;
M = Wollastonite, treated;
N = magnesium hydroxide

TABLE 4

| Additive | Ex 18 | Ex 19 | Ex 20 | Ex 21 | Ex 22 | Ex 23 | Ex 24 | Ex 25 | Ex 26 |
|---|---|---|---|---|---|---|---|---|---|
| A | 75.4 | 75.4 | 74.4 | 72.4 | 74.4 | 72.4 | 73.4 | 71.4 | 71.4 |
| B | 0.1 | 0.1 | 0.1 | 0.1 | 0.1 | 0.1 | 0.1 | 0.1 | 0.1 |
| C | 22 | 18 | 18 | 20 | 18 | 20 | 18 | 20 | 18 |
| D | | 2 | | | | | | | |
| E | 3 | | 5 | 5 | | | 3 | 3 | 3 |
| F | | | | | 5 | 5 | 3 | 3 | 5 |
| G | 0.5 | 0.5 | 0.5 | 0.5 | 0.5 | 0.5 | 0.5 | 0.5 | 0.5 |
| H | 2 | 1 | 2 | 2 | 2 | 2 | 2 | 2 | 2 |
| TOTAL (wt %) | 100 | 100 | 100 | 100 | 100 | 100 | 100 | 100 | 100 |

A = PA66, high viscosity;
B = Acrawax (lubricant);
C = bis(pentabromophenyl)ethane (halogen, bromine-containing flame retardant);
D = diantimony trioxide (synergist);
E = zinc borate (synergist);
F = zinc stannate (synergist);
G = phenolic organic heat stabilizer;
H = diundecyl phthalate (plasticizer)

TABLE 5

| Additive | Ex 27 | Ex 28 | Ex 29 | Ex 30 |
|---|---|---|---|---|
| A | 76.4 | 76.4 | 74.5 | 73.9 |
| B | | | 0.1 | 0.1 |
| C | 0.1 | | | |
| D | | 0.1 | | |
| E | 18 | 18 | 18 | 18 |
| F | 3 | 3 | 3 | 3 |
| G | 0.5 | 0.5 | 0.5 | 0.5 |
| H | 2 | 2 | 2 | 2 |
| I | | | 1.875 | 2.5 |
| TOTAL (wt %) | 100 | 100 | 100 | 100 |

A = PA66, high viscosity;
B = Acrawax (lubricant);
C = stearyl eurcamide (lubricant);
D = zinc stearate (lubricant);
E = bis(pentabromophenyl)ethane (halogen, bromine-containing flame retardant);
F = diantimony trioxide (synergist);
G = phenolic organic heat stabilizer;
H = diundecyl phthalate (plasticizer);
I = carbon black in PA6 (colorant)

Table 6 lists UL94 flammability testing data and mechanical testing data for the above-identified Examples 1-30.

TABLE 6

| Ex | UL94 3.2 mm | UL94 1.6 mm | UL94 0.8 mm | UL94 0.4 mm | VN/RV | TS | TM | Eb | Fs | Fm | II | C | DTUL | D | GWIT at 0.75 mm | CTI (V) |
|---|---|---|---|---|---|---|---|---|---|---|---|---|---|---|---|---|
| C-1 | V-2 13 | V-2 16 | V-0 13 | V-0 15 | 138/51 | 75 | | 5 | 103 | 3403 | 5.69 ± 0.45 | 4.4 ± 0.3 | 69.5 | 1.26 | | |
| 2 | V-0 6 | V-0 3 | V-0 4 | V-0 2 | 43 | 80 | | 7 | 106 | 3591 | | | | | | |
| 3 | V-2 33 | V-2 21 | V-2 7 | V-2 8 | 38 | 69 | | 24 | 95 | 3379 | | | | | | |
| 4 | V-2 26 | V-2- 19 | V-2 9 | V-2 9 | 39 | 68 | | 29 | 88 | 3210 | | | | | | |
| 5 | V-0 3 | V-0 4 | V-0 5 | V-0 0 | 37 | 72 | | 21 | 92 | 3340 | | | | | | |
| 6 | V-2 50 | V-2 33 | V-2 4 | V-2 1 | 63 | 70 | | 22 | 88 | 3190 | | | | | | |
| 7 | V-0 0 | V-0 0 | V-0 3 | V-0 0 | 53 | 71 | | 19 | 90 | 3381 | | | | | | |
| 8 | V-2 10 | V-2 7 | V-2 9 | V-0 1 | 52 | 67 | | 23 | 89 | 3231 | | | | | | |
| 9 | V-0 0 | V-0 0 | V-0 1 | V-0 0 | 48 | 69 | | 19 | 89 | 3183 | | | | | | |
| 10 | V-0 8 | V-0 6 | V-0 2 | V-0 6 | 49 | 73 | | 18 | | | | | | | | 250 |
| 11 | V-0 14 | V-0 14 | V-0 11 | V-0 11 | 54 | 75 | | 4 | | | | | | | | |
| 12 | V-0 21 | V-0 17 | V-0 14 | V-2 11 | 53 | 73 | | 6 | | | | | | | | |

TABLE 6-continued

| Ex | UL94 3.2 mm | UL94 1.6 mm | UL94 0.8 mm | UL94 0.4 mm | VN/RV | TS | TM | Eb | Fs | Fm | II | C | DTUL | D | GWIT at 0.75 mm | CTI (V) |
|---|---|---|---|---|---|---|---|---|---|---|---|---|---|---|---|---|
| 13 | V-0 18 | V-0 16 | V-0 12 | V-0 13 | 60 | 69 | | 5 | | | | | | | | |
| 14 | V-2 70 | V-2 144 | V-2 39 | HB 53 | 50 | 74 | | 5 | | | | | | | | |
| 15 | V-0 25 | HB 140 | V-2 34 | HB 8 | 54 | 68 | | 8 | | | | | | | | |
| 16 | V-0 11 | V-0 14 | V-0 11 | V-0 11 | 67 | 72 | | 10 | | | | | | | | |
| 17 | V-0 11 | V-0 10 | V-0 10 | V-0 11 | 55 | 73 | | 9 | | | | | | | | 275 |
| 18 | V-2 42 | V-2 14 | V-2 5 | V-2 0 | 56 | 68 | | 31 | | | | | | | | |
| 19 | V-2 30 | V-2 42 | V-2 11 | V-0 5 | 55 | 74 | | 12 | | | | | | | | 300 |
| 20 | HB 142 | V-2 101 | V-2 32 | V-2 15 | 49 | 64 | | 12 | | | | | | | | |
| 21 | HB 183 | V-2 132 | V-2 49 | V-2 22 | 43 | 66 | | 13 | | | | | | | | |
| 22 | V-0 6 | V-2 64 | HB 75 | HB 90 | 54 | 74 | | 23 | | | | | | | | |
| 23 | V-0 9 | HB 134 | V-2 40 | HB 19 | 58 | 71 | | 24 | | | | | | | | |
| 24 | V-0 8 | V-2 98 | HB 69 | V-2 14 | 58 | 73 | | 22 | | | | | | | | |
| 25 | V-0 10 | V-2 27 | HB 46 | HB 31 | 56 | 73 | | 20 | | | | | | | | |
| 26 | V-0 2 | V-0 14 | HB 37 | V-2 20 | 56 | 71 | | 21 | | | | | | | | |
| 27 | V-0 0 | V-0 0 | V-0 0 | V-0 0 | 48 | 70 | 2776 | 14 | 89 | 3421 | 3.9 | 3.3 | 77 | 1.32 | 930 | |
| 28 | V-0 0 | V-0 0 | V-0 0 | V-0 0 | 48 | 73 | 2945 | 32 | 83 | 3360 | 3.9 | 2.8 | | 1.32 | 960 | |
| 29 | V-0 14 | V-0 14 | V-0 12 | V-0 11 | 53 | 75 | | 9 | 95 | 3388 | | 2.7 | | | 930 | 275 |
| 30 | V-0 13 | V-0 16 | V-0 14 | V-0 12 | 57 | 75.4 | | 7 | 96 | 3400 | | 2.9 | | | | 275 |

C-1 = Comparative Example 1;
VN = Viscosity Number;
RV = Relative Viscosity;
TS = Tensile Strength;
TM = Tensile Modulus;
Eb = Elongation at break;
Fs = Flexural Strength;
Fm = Flexural Modulus;
II = Izod Impact-notched;
C = Charpy Notched Impact Strength (23° C.);
DTUL = Deflection Temperature under load;
D = Density;
GWIT = Glow Wire Ignition Temperature (° C.);
CTI = Comparative Tracking Index (V)

Table 7 lists several commercial (conventional) polyamide compositions that were tested against an exemplary composition of the present invention. Table 8 compares selected electrical properties of these compositions and Table 9 compares their elongation/impact properties.

TABLE 7

| | Trademark | Grade Code | Material Type/Feature |
|---|---|---|---|
| Example 1 | | | HFR-PA66, unfilled |
| Conventional 1 | Vydyne ® | M344 | HFR-PA66, unfilled |
| Conventional 2 | Schulamid ® | 6 MV 14 FR 4 K1681 | HFR-PA6, unfilled, mel-cyanurate and Saytex 8010 |
| Conventional 3 | Durethan ® | B 30 S F30 | HFR-PA6, unfilled, aromatic Br compound with ATO |
| Conventional 4 | Durethan® | A 30 S F30 | HFR-PA66, unfilled, aromatic Br compound with ATO |
| Conventional 5 | Latamid ® | 66 H2PX-V0 | HFR-PA66, unfilled, impact modified |
| Conventional 6 | Nilamid ® Frianyl ® | A FR C4 A3 V0-XI | HFR-PA66, unfilled, ATO and PBDE free |

TABLE 7-continued

| | Trademark | Grade Code | Material Type/Feature |
|---|---|---|---|
| Conventional 7 | Technyl ® | A 30G1 | HFR-PA66, unfilled, heat stabilized |
| Conventional 8 | Technyl ® | A 32G1 | HFR-PA66, unfilled, heat stabilized |
| Conventional 9 | Glamide ® | T-669VNR | HFR-PA66, unfilled |
| Conventional 10 | | BV2120 | HFR-PA66, unfilled |
| Conventional 11 | Vampamid ® | 66 0023 V0 H GW | HFR-PA66, unfilled, heat stabilized |

TABLE 8

| | Thickness | RTI [Elec/Imp/Str] | Flame Class | GWFI (° C.) | GWIT (° C.) |
|---|---|---|---|---|---|
| Example 1 | 0.40 mm | [130/65/110] | V-0 | 960 | 960 |
| | 0.75 mm | [130/65/110] | V-0 | 960 | 960 |
| | 1.5 mm | [130/65/110] | V-0 | 960 | 960 |
| | 3.0 mm | [130/65/110] | V-0 | 960 | 960 |
| Conventional 1 | 0.43 mm | [65/65/65] | V-0 | | |
| | 0.71 mm | [130/65/95] | V-0 | 960 | 700 |
| | 1.5 mm | [130/95/95] | V-0 | 960 | 700 |
| | 2.0 mm | [130/95/95] | V-0 | | |
| | 3.0 mm | [130/95/95] | V-0 | 960 | 725 |
| Conventional 2 | 0.38 mm | [130/75/100] | V-2 | 960 | 930 |
| | 0.75 mm | [130/90/110] | V-2 | 930 | 930 |
| | 1.5 mm | [130/100/120] | V-2 | 960 | 825 |
| | 3.0 mm | [130/100/120] | V-2 | 960 | 825 |
| Conventional 3 | 0.40 mm | [150/100/100] | V-0 | 960 | 960 |
| | 0.75 mm | [150/100/100] | V-0 | 960 | 900 |
| | 1.5 mm | [150/105/105] | V-0 | | |
| | 2.0 mm | [150/105/105] | V-0 | | |
| | 3.0 mm | [150/105/105] | V-0 | 960 | 850 |
| Conventional 4 | 0.40 mm | [65/65/65] | V-0 | 960 | 825 |
| | 0.75 mm | [65/65/65] | V-0 | 960 | 825 |
| | 1.5 mm | [65/65/65] | V-0 | 960 | 825 |
| | 3.0 mm | [65/65/65] | V-0 | 960 | |
| Conventional 5 | 0.40 mm | [65/65/65] | V-2 | | |
| | 0.75 mm | [65/65/110] | V-0 | | |
| | 1.0 mm | [130/65/110] | V-0 | | |
| | 1.5 mm | [130/65/110] | V-0 | 960 | 775 |
| | 3.0 mm | [130/65/110] | V-0 | 960 | 775 |
| Conventional 6 | 0.45 mm | [120/65/65] | V-0 | 960 | 825 |
| | 0.80 mm | [130/65/65] | V-0 | 960 | 800 |
| | 1.6 mm | [130/65/65] | V-0 | 960 | 775 |
| | 3.0 mm | [130/65/65] | V-0 | 960 | 775 |
| Conventional 7 | 0.45 mm | [65/65/65] | V-0 | | |
| | 0.75 mm | [65/65/65] | V-0 | 960 | 825 |
| | 1.5 mm | [65/65/65] | V-0 | 960 | 775 |
| | 3.0 mm | [65/65/65] | V-0 | | |
| Conventional 8 | 0.75 mm | [65/65/65] | V-2 | 900 | 875 |
| | 1.5 mm | [65/65/65] | V-2 | 900 | 900 |
| | 3.0 mm | [65/65/65] | V-2 | | |
| Conventional 9 | 0.77 mm | [65/65/65] | V-0 | | |
| Conventional 10 | 0.75 mm | [65/65/65] | V-0 | | |
| Conventional 11 | 0.40 mm | [140/140/140] | V-0 | | |
| | 0.80 mm | [140/140/140] | V-0 | | |
| | 1.5 mm | [140/140/140] | V-0 | 960 | 775 |
| | 3.0 mm | [140/140/140] | V-0 | 960 | 775 |

TABLE 9

| | Tensile Strength Yield/Break (MPa) | Tensile Elongation Yield/Break (%) | Tensile Modulus (MPa) | Flexural Modulus (MPa) | Notched Charpy Impact 23° C./−30° C. (kj/m²) |
|---|---|---|---|---|---|
| Example 1 | −/70 | −/17 | 3200 | 3200 | 4.5/− |
| Conventional 1 | 60/− | 5/35 | 3500 | 3000 | 5.5/5.2 |
| Conventional 2 | 70/− | 3.0/− | 3800 | | 4.0/3.0 |
| Conventional 3 | 70/− | 3.7/− | 3600 | 3200 | <10/<10 |
| Conventional 4 | | −/6 | 3700 | | |
| Conventional 5 | 55/50 | 2.5/10 | 2800 | | 7/− |
| Conventional 6 | 56/− | 2.5/4 | 3000 | | |
| Conventional 7 | | | | | |
| Conventional 8 | −/50 | 15/− | 2950 | | 6/− |
| Conventional 9 | | | | | |
| Conventional 10 | −/77 | −/3 | 3300 | 3200 | 3/− |
| Conventional 11 | 50/− | −/10 | 2600 | | 7/− |

When compared to conventional polyamide compositions, the halogen-containing fire retardant polyamide compositions of the present invention were observed to unexpectedly (i) exhibit best in class Glow Wire Ignition Test performance (960° C. at all tested thicknesses) for an unfilled PA66 composition; (ii) exhibit excellent toughness by maintaining an ultimate elongation at a break minimum of 13%; (iii) provide high flow that allows the filling of thin-walled parts during injection molding at reduced cavity and injection pressures.

All publications and patents cited herein are incorporated by reference in their entireties.

The invention claimed is:

1. A flame retardant polyamide composition consisting of:
   at least 65% by weight of PA6,6 or PA6,6/6 or a combination thereof:
   a bromine-containing flame retardant;
   a hindered phenolic heat stabilizer;
   1-8% by weight of a flame retardant synergist;
   0-5% by weight of a colorant;
   0-5% by weight of a lubricant;
   0-5% by weight of a mold release agent;
   0-5% by weight of an acid scavenger;
   0-5% by weight of a plasticizer;
   wherein the percentages are based on the total weight of the polyamide composition;
   wherein the polyamide composition exhibits a glow wire ignition temperature greater than 850° C. and an elongation at break greater than 13%.

2. The polyamide composition according to claim 1, wherein the polyamide resin is PA-6,6.

3. The polyamide composition according to claim 1, wherein the bromine-containing flame retardant is bis(pentabromophenyl)ethane.

4. The polyamide composition according to claim 1, wherein the hindered phenolic heat stabilizer is N,N'-hexamethylenebis(3,5-di-tert-butyl-4-hydroxy-hydrocinnamamide).

5. The polyamide composition according to claim 1, wherein the flame retardant synergist is diantimony trioxide.

6. The polyamide composition according to claim 1, wherein a plasticizer is present.

7. The polyamide composition according to claim 6, wherein the plasticizer is diundecyl phthalate.

8. The polyamide composition according to claim 1, wherein a lubricant or a mold release agent or a combination thereof is present.

9. The polyamide composition according to claim 1, wherein a colorant is present.

10. The polyamide composition according to claim 1, wherein the composition consists of:
   65-85% by weight of the PA6,6 or PA6,6/6 or a combination thereof;
   5-35% by weight of the bromine-containing flame retardant; and
   0.01-5% by weight of the hindered phenolic heat stabilizer.

11. An article obtained from the polyamide composition according to claim 10.

12. The article according to claim 11, where the article is an electrical or electronic part.

13. An article obtained from the polyamide composition according to claim 1.

14. The article according to claim 13, where the article is an electrical or electronic part.

* * * * *